United States Patent [19]

Yokoyama et al.

[11] Patent Number: 4,816,334
[45] Date of Patent: Mar. 28, 1989

[54] MAGNETIC RECORDING MEDIUM

[75] Inventors: Kenji Yokoyama; Masatoshi Nakayama; Fumio Maruta; Kunihiro Ueda, all of Nagano, Japan

[73] Assignee: TDK Corporation, Tokyo, Japan

[21] Appl. No.: 33,617

[22] Filed: Apr. 3, 1987

[30] Foreign Application Priority Data

Apr. 4, 1986 [JP] Japan .................. 61-77735

[51] Int. Cl.⁴ ................... G11B 5/71; G11B 5/72
[52] U.S. Cl. ................... 428/336; 427/40; 427/41; 427/128; 427/129; 427/131; 427/132; 428/408; 428/421; 428/422; 428/694; 428/695; 428/900
[58] Field of Search ........... 428/328, 329, 421, 422, 428/408, 695, 336; 427/40, 41, 129, 131, 132; 360/134–136

[56] References Cited

U.S. PATENT DOCUMENTS

| | | | |
|---|---|---|---|
| 4,411,063 | 10/1983 | Aine | 428/900 |
| 4,529,651 | 7/1985 | Kitoo | 428/336 |
| 4,557,944 | 12/1985 | Arai | 427/39 |
| 4,565,734 | 1/1986 | Arai | 427/131 |
| 4,581,245 | 4/1986 | Nakamura | 427/40 |
| 4,647,494 | 3/1987 | Meyerson | 428/216 |
| 4,659,633 | 4/1987 | Yamaguchi | 428/422 |
| 4,693,927 | 9/1987 | Nishikawa | 428/336 |

FOREIGN PATENT DOCUMENTS

| | | | |
|---|---|---|---|
| 52-18001 | 5/1977 | Japan . | |
| 54-33726 | 10/1979 | Japan . | |
| 57-6177 | 2/1982 | Japan . | |
| 57-17292 | 4/1982 | Japan . | |
| 59-39809 | 9/1984 | Japan . | |
| 0258727 | 12/1985 | Japan | 428/328 |
| 0005437 | 1/1986 | Japan | 428/329 |
| 126627 | 6/1986 | Japan . | |
| 142525 | 6/1986 | Japan . | |
| 1208621 | 9/1986 | Japan | 427/131 |

Primary Examiner—Ellis P. Robinson
Attorney, Agent, or Firm—Oblon, Fisher, Spivak, McClelland & Maier

[57] ABSTRACT

In a magnetic recording medium wherein a metal thin film magnetic layer, a protective film or carbon, and a topcoat layer are formed on a rigid substrate in this order, the topcoat layer is from an organic fluorine compound by gas phase deposition.

2 Claims, 1 Drawing Sheet

MAGNETIC RECORDING MEDIUM

CROSS REFERENCE TO RELATED APPLICATIONS

Reference is made to copending applications Ser. No. 943,329 filed Dec. 19, 1986, MARUTA et al, for Magnetic Recording Medium and Ser. No. 868,511 filed May 30, 1986, UEDA et al, for Magnetic Recording Medium where both applications are assigned to the same assignee as the present invention and incorporated herein by reference.

BACKGROUND OF THE INVENTION

This invention relates to a magnetic recording medium, and more particularly, to an improvement in a protective film on a magnetic layer of a magnetic recording medium of the hard type such as magnetic disks and drums.

Magnetic recording media used in cooperation with magnetic disk apparatus are generally known as magnetic disks or disk media and have the basic structure comprising a doughnut shaped substrate having a magnetic layer usually on each of its surfaces.

The materials of which the substrates of such magnetic recording media are made include two types, hard materials such as aluminum alloy and plastic materials such as Mylar as also used in magnetic tape media. In general, the former is called a magnetic disk of the hard type and the latter a flexible disk.

The magnetic recording media for use with magnetic disk or drum apparatus, particularly hard type magnetic disks encounter some problems of durability and abrasion resistance against mechanical contact with a magnetic head. To this end, magnetic recording media are usually provided with a protective film. Known as the protective film of such media are protective films of inorganic material and lubricating films of solid lubricant.

The inorganic protective films used in the prior art are formed from, for example, Rh and Cr as disclosed in Japanese Patent Publication No. 52-18001, Ni-P as disclosed in Japanese Patent Publication No. 54-33726, Re, Os, Ru, Ag, Au, Cu, Pt and Pd as disclosed in Japanese Patent Publication No. 57-6177, and Ni-Cr as disclosed in Japanese Patent Publication No. 57-17292. The commonly used solid lubricants are inorganic and organic lubricants including silicon compounds such as $SiO_2$, SiO, and $Si_3N_4$ as disclosed in Japanese Patent Publication No. 54-33726, polysilicic acid and silane coupling agents such as tetrahydroxysilane and polyaminosilane as disclosed in Japanese Patent Publication No. 59-39809, and carbon.

The conventional protective films formed on the magnetic layer from these materials are somewhat unsuccessful in enhancing the durability, abrasion resistance, weatherability, and corrosion resistance of the associated media and suffer from the phenomenon called grip that the head adheres to the medium surface.

In our copending application Ser. No. 943,329 filed Dec. 19, 1986, we proposed a topcoat layer on a magnetic recording medium, comprising an organic fluorine compound of the same type as used in the present invention and characterized by improvements in durability, abrasion resistance, weatherability, corrosion resistance and grip resistance. The present invention represents an advance over this copending application in that a more thin and uniform topcoat can be realized.

Also, in our copending application Ser. No. 868,511 filed May 30, 1986, we proposed a topcoat layer for a magnetic tape having a metal magnetic thin film layer, the topcoat layer being formed from a fluorocarbon resin by sputtering or ion plating.

SUMMARY OF THE INVENTION

An object of the present invention is to provide a novel and improved magnetic recording medium free of head grip and having excellent durability, abrasion resistance, weatherability, and corrosion resistance as well as increase reliability in practical applications.

According to a first aspect of the present invention, there is provided a magnetic recording medium comprising
a rigid substrate,
a metal thin film magnetic layer on the substrate, and
a topcoat layer of an organic fluorine compound formed on the magnetic layer by gas phase deposition.

According to a second aspect of the present invention, there is provided a magnetic recording medium comprising
a rigid substrate,
a metal thin film magnetic layer on the substrate,
a protective film of carbon on the magnetic layer, and
a topcoat layer of an organic fluorine compound formed on the protective film by gas phase deposition.

BRIEF DESCRIPTION OF THE DRAWING

The only drawing.

DETAILED DESCRIPTION OF THE PREFERRED EMBODIMENTS

Figure 1:
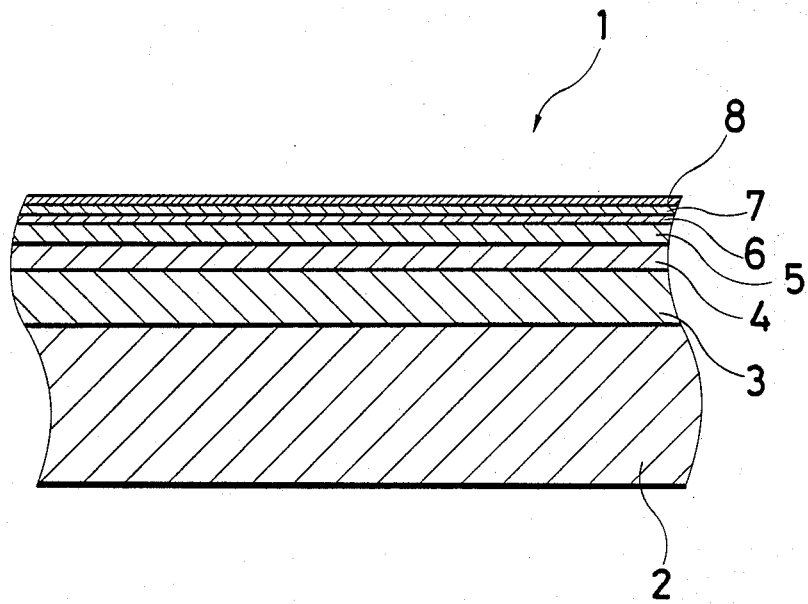
FIG. 1 is a cross-sectional view of a magnetic recording medium according to one preferred embodiment of the present invention.

Referring to FIG. 1, there is illustrated in cross section a magnetic recording medium generally indicated at 1 according to one preferred embodiment of the present invention. The magnetic recording medium 1 includes a nonmagnetic rigid substrate 2 for carrying a necessary number of layers thereon. In general on the substrate 2, an undercoat layer 3, a nonmagnetic metal intermediate layer 4, a metal thin film magnetic layer 5, a nonmagnetic metal protective layer 6, a carbon protective film 7, and a topcoat layer 8 are disposed one on top of the other in this order.

According to the present invention, the topcoat layer 8 is formed from an organic fluorine compounds by gas phase deposition as the uppermost layer of the medium. The organic fluorine compound is preferably selected from the group consisting of (A) carboxyperfluoropolyethers and salts and esters thereof, (B) perfluoropolyethers, (C) tetrafluoroethylene polymers, and (D) other fluorocarbon resins.

(A) Carboxyperfluoropolyethers, salts and esters

In a first embodiment, the topcoat layer 8 contains a carboxyperfluoropolyether or a salt or ester thereof.

The perfluoropolyethers are perfluoro devirative of polyalkylethers. The carboxyperfluoropolyethers are those perfluoropolyethers having a carboxylic acid radical or its salt substituted at their end. The number of carboxylic acid radicals is not particularly limited, but is preferably 1 or 2.

Typical carboxyperfluoropolyethers, salts, and esters used herein are compounds having the general formula (I):

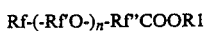  (I)

wherein Rf represents a fluorine atom, a perfluoroalkyl radical, —COOZ, or —ORf"COOZ;

Rf' and Rf" are independently selected from divalent perfluoroalkylene radicals and may be the same or different;

n is a positive integer, with the proviso that when n is 2 or more, a corresponding plurality of Rf' may be the same or different;

R1 represents hydrogen, a monovalent cation, or a substituted or unsubstituted alkyl radical; and Z has the same meaning as R1, with the proviso that Z and R1 in formula (I) may be the same or different.

Examples of the perfluoroalkyl radicals represented by Rf include —CF$_3$, —C$_2$F$_5$, —C$_3$F$_7$, etc. Examples of perfluoroalkylene radicals represented by Rf' and Rf" include

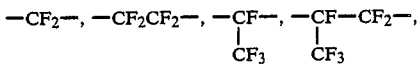

etc., with —CF$_2$—, —CF$_2$CF$_2$—, and —CF(CF$_3$)—CF$_2$— being preferred.

Preferred examples of Rf are —F, —COOCH$_3$, —COOH, —COOC$_2$H$_5$, —COOC$_3$H$_7$, —COONa, or —COONH$_4$.

Examples of the substituted or unsubstituted alkyl represented by R1 include —CH$_3$, —C$_2$H$_5$, —C$_3$H$_7$, —C$_3$H$_7$, —C$_4$H$_9$, and —C$_5$H$_{11}$. R1 is preferably selected from unsubstituted alkyl radicals having 1 to 5 carbon atoms, more preferably CH$_3$ and —C$_2$H$_5$.

Examples of the cations represented by R1 include alkali metal cations such as Na$^+$, K$^+$, and Li$^+$, and NH$_4^+$.

The letter n generally ranges from about 10 to about 100, preferably from 30 to 70.

When more than one Rf' is present, they may be the same or different.

The esters having formula (I) may be either carboxylic acid monoester or diesters.

Preferred among the compounds of formula (I) are those compounds having the general formulae:

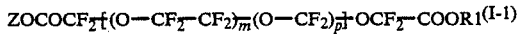  (I-1)

  (I-2)

wherein Z and R1 are as defined in formula (I), the sum of m and p is the same as n defined in formula (I). Preferably Z and R1 are H and —CH$_3$, and each of m and p generally ranges from 5 to 50, preferably from 5 to 20.

Another preferred class includes those compounds having the general formulae:

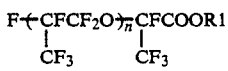  (I-3)

-continued

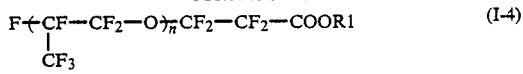  (I-4)

wherein R1 and n are as defined in formula (I). Preferably R1 is H, —CH$_3$ or —C$_2$H$_5$, and n generally ranges from 10 to 100, preferably from 30 to 70.

These compounds have a molecular weight of about 1,000 to 10,000.

These compounds may be readily synthesized by a conventional known method and are commercially available.

Typical examples of commercial products of these compounds are KRYTOX 157FS manufactured by E. I. DuPont which corresponds to the compounds of formula (I-3) wherein R1 is H and n is 11 to 49, FOMBLIN Z DIAC manufactured by Montefluos which corresponds to the compounds of formula (I2), and FOMBLIN Z DEAL manufactured by Montefluos which corresponds to the compounds of formula (I-1) wherein Z and R1 are methyl, and m and p are 11 to 49. The solids of these materials may be utilized in gas phase deposition.

(B) Perfluoropolyethers

In a second embodiment, the topcoat layer 8 contains a perfluoropolyether.

Typical perfluoropolyethers used herein are compounds having the general formula (II):

R2f-(-R2f'O-)$_n$-R2f"

wherein R2f represents a fluorine atom or a perfluoroalkyl radical; R2f' is a perfluoroalkylene radical; R2f" is a perfluoroalkyl radical; and n is a positive integer. When R2f is a perfluoroalkyl radical, R2f and R2f" may be the same or different. When n is 2 or more, a corresponding plurality of R2f' may be the same or different.

Examples of the perfluoroalkyl radicals represented by R2f include —CF$_3$, —C$_2$F$_5$, etc. Preferably, R2f is —F or —CF$_3$. Examples of perfluoroalkylene radicals represented by R2f' include

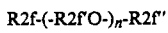

etc., Examples of the perfluoroalkyl radicals represented by R2f" include —CF$_3$, —C$_2$F$_5$, etc.

The letter n generally ranges from about 10 to about 100, preferably from 10 to 50.

Preferred among the compounds of formula (II) are those compounds having the general formulae (II-1) and (II2):

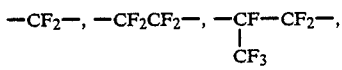

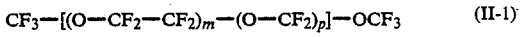  (II-1)

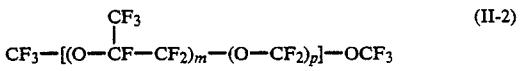  (II-2)

wherein the sum of m and p is about 10 to 100. Each of m and p generally ranges from 5 to 50, preferably from 5 to 30.

Another preferred class includes those compounds having the general formula (II-3):

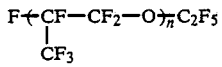
(II-3)

wherein n is as defined in formula (II). The letter n generally ranges from 10 to 100, preferably from 30 to 70.

These compounds have an average molecular weight of about 1,000 to 10,000.

These compounds may be readily synthesized by a conventional known method and are commercially available.

Typical examples of commercial products of these compounds are FOMBLIN Y04, Y06, Y25, Y45, YR; FOMBLIN Y-L-VAC0616, Y-L-VAC 14/6, Y-L-VAC 16/6, Y-L-VAC 25/6; FOMBLIN Y-H-VAC 18/8, Y-H-VAC 25/9, Y-H-VAC 40/11, Y-H-VAC 140/13; and FOMBLIN Z, all manufactured by Montefluos Company; and KRYTOX 143CZ, 143AZ, 143AA, 143AY, 143AB, 143AC, 143AD, KRYTOX 1502, 1504, 1506, 1509, 1514, 1516, 1525, 1618, 1625, 1645, 1680, and 1614, all manufactured by E. I. DuPont. Among them, KRYTOX 143CZ corresponds to the compounds of formula (II-3) wherein n is 11 to 49, and FOMBLIN Y and Z correspond to formulae (II-2) and (II-1), respectively. The solids of these materials may be utilized in gas phase deposition.

(C) Tetrafluoroethylene polymers

In a third embodiment, the topcoat layer 8 contains a tetrafluoroethylene polymer preferably having a molecular weight of 1,000 to 10,000.

The polymers preferably have a softening point of about 200° to 300° C. as measured according to ASTM E-28-58T and a melting point of about 200° to 350° C.

These polymers may be readily synthesized by a conventional well-known method and commercially available.

Typical examples of commercially available products of the tetrafluoroethylene polymers are Vydax A12, 5100, 550, and 525 manufactured by E. I. DuPont and AG-LUB manufactured by Asahi Glass K.K. The solids of these materials may be utilized in gas phase deposition.

(D) Fluorocarbon resins

In a fourth embodiment, the topcoat layer 8 contains a fluorocarbon resin.

Typical fluorocarbon resins used herein include polyvinylidene fluoride (PVdF), polyvinyl fluoride (PVF), tetrafluoroethylene-hexafluoropropylene copolymers (FEP), tetrafluoroethylene-ethlyene copolymers (ETFE), tetrafluoroethylene-perfluoroalkylvinyl ether copolymers (PFA), chlorotrifluoroethylene-ethylene copolymers (ECTFE), etc. Preferred among them are tetrafluoroethylene-hexafluoropropylene copolymers (FEP) and tetrafluoroethylene-hexafluoropropylene copolymers (ETFE). The fluorocarbon resins preferably have an average degree of polymerization of about 700 to 3,000.

In gas phase deposition of the topcoat layer, solid components of any of these compounds (A) to (D) may be used as source material. The compounds (A) to (D) may be used alone or as a mixture of two or more.

According to the present invention, the topcoat layer 8 is formed by gas phase deposition. If the topcoat is formed by coating a resin rather than gas phase deposition, then it is difficult to form a thin coating to a uniform thickness. The gas phase deposition has the feature that no organic solvent is contained in the topcoat deposited. Therefore, the topcoat formed by gas phase deposition has various advantages including a uniform thickness, and less frequent grip by a head and low friction because no solvent is present in the film.

Typical gas phase deposition processes include evaporation, sputtering and ion plating. Any of these methods may be utilized in the present invention although the use of vacuum deposition or sputtering is preferred.

First, the vacuum deposition is a method wherein an evaporation source is melted and evaporated by heating in a highly evacuated atmosphere at about $10^{-3}$ Torr or lower by electron beam, resistance heating and the like. The resulting vapor is deposited, for example, on the substrate surface to form a thin film. The vapor particles are imparted with a kinetic energy of about 0.1 to 1 eV upon evaporation.

Next, the sputtering process will be described. The sputtering process may be further classified into plasma sputtering and ion beam sputtering depending on the region where operation is conducted.

In the plasma sputtering process, an abnormal glow discharge is generated in an atmosphere of an inert gas such as argon, a target of source material to be evaporated is sputtered with the resulting Ar ions, and the thus generated vapor of source material is deposited or condensed on the substrate. Included are a DC sputtering technique wherein a DC voltage of several kilovolts is applied and a high frequency sputtering technique wherein a high frequency power of several to several hundred kilowatts is applied. A magnetron type sputtering technique is also useful wherein a multi-pole sputtering equipment such as two, three or four pole sputtering equipment is used, and electromagnetic fields are applied in two perpendicular directions to impart a cycloidal motion to electrons in the plasma, as by a magnetron, to form a high density plasma, thereby reducing the voltage applied and improving the sputtering efficiency. If desired, instead of a pure inert gas atmosphere such as argon, there may be used reactive sputtering wherein sputtering is carried out in an atmosphere containing $F_2$ or $CF_4$ in admixture with argon and chemical sputtering using an atmosphere containing an active gas such as $O_2$ and $N_2$ in admixture with argon.

In the ion beam sputtering process, a suitable ionization source like argon (Ar) is ionized. The ionized Ar is driven out as an ion beam in a high vacuum by applying a negative high voltage across driving electrodes. The ion beam is impinged on the surface of a target of source material to be evaporated. The resulting vapor of source material is deposited or condensed on the substrate.

In either sputtering process, the operating pressure is about $10^{-2}$ to $10^{-3}$ Torr.

These sputtering processes impart particles of source material with a kinetic energy of about several eV (electron volts) to about 100 eV which is substantially greater than the kinetic energy of about 0.1 eV to about 1 eV given by the evaporation processes.

Further, the ion plating process is an atomistic film forming process wherein evaporated material ions having a sufficient kinetic energy are bombarded on the surface of a substrate before and during formation of a film thereon. The basic functions involved are sputtering, heating and ion implantation of the substrate by bombarding ions, which affect the adherence, nucleation and growth of a film being deposited. The ion plating process may be further classified into plasma and ion beam processes depending on the region where operation is carried out.

In the plasma ion plating process, a substrate held at a negative potential is cleaned by impinging $Ar^+$ or similar cations thereon under a DC glow discharge, and an evaporation source is then heated to evaporate the source material which is ionized in the plasma. The resulting source material ions are accelerated under an electric field of increased intensity in a cathodic dark region of the glow discharge surrounding the substrate and then bombarded on the substrate with a high energy, whereby the material deposits on the substrate. Any techniques of plasma ion plating may be employed including DC application, high frequency excitation, and their combination, and their combination with various heating modes of the evaporation source. A plasma electron beam technique using a hollow cathode plasma electron gun may also be employed.

In the ion beam plating process, a source material is converted into ions by any ion producing means including sputtering, electron bombardment, or modified duoplasmatron equipment. The resulting vapor of source material ions is driven out into a high vacuum region under a controlled accelerating voltage to successively carry out cleaning and deposition on the surface of a substrate. A cluster ion beam technique for evaporation and crystal growth may also be employed wherein a jet of source material is injected from a crucible into a high vacuum through an injection nozzle to form a cluster containing $10^2$ to $10^3$ loosely combined atoms by utilizing an overcooling phenomenon due to adiabatic expansion.

The kinetic energy imparted to ions by ion plating is in the range of from about several ten eV to about 5000 eV, which is greatly higher than that given by dry coating processes, for example, evaporation process (about 0.1 eV to about 1 eV) and sputtering process (about several eV to about 100 eV). For this reason, the film deposited by ion plating exhibits an outstandingly increased adherence. An increased rate of deposition completes film formation within a short time.

A recently developed arc discharge ion plating technique involving thermionic ionization may also be used. The arc discharge ion plating technique includes heating an evaporation source to form a stream of vapor, impinging electrons emitted from a thermionic emission source against the vapor stream at a position near the evaporation source where the vapor stream is relatively dense, thereby ionizing the vapor stream, and focusing the ionized vapor stream under an electric or magnetic field at a substrate in a direction perpendicular thereto.

In these gas phase deposition processes, conditions such as substrate temperature, substrate-to-hearth or target distance and the like may be as usual.

More particularly, the vacuum deposition process favors a substrate temperature of about 10° to 100° C., a substrate-to-hearth distance of about 1 to 20 cm, an operating pressure of about $5 \times 10^{-1}$ to $10^{-4}$ Pa, and a film depositing rate of about 1 to 100 Å per second.

The sputteing process favors a substrate temperature of about 10° to 100° C., a substrate-to-target distance of about 1 to 20 cm, an operating pressure of about $10^{-1}$ to 10 Pa, and a film forming rate of about 5 to 1000 Å per second.

Generally, the topcoat layer 8 thus formed has a thickness of from 3 to 300 Å, preferably from 5 to 150 Å. A thickness of less than 3 Å fails to provide the benefits of the invention, particularly durability. Topcoat layers having a thickness in excess of 300 Å are liable to grip, giving rise to so-called head crush.

The topcoat layer 8 may be directly formed on the metal thin film magnetic layer 5 although much better durability and weatherability are enabled by forming the carbon protective film 7 on the magnetic layer before the topcoat layer is formed. The carbon protective film 7 has a composition consisting essentially of carbon although the composition may contain less than 5% by weight of another element.

The carbon protective film 7 may be formed by any gasphase deposition techniques including sputtering, ion plating, evaporation, and chemical vapor deposition (CVD). Among them sputtering is most preferred because there is produced a very coherent dense film which is effective in durability and weatherability improvements.

The carbon protective film 7 generally have a thickness of 100 to 800 Å, preferably 150 to 400 Å.

Preferably, the carbon protective film 7 is plasma treated at its surface prior to covering with the topcoat layer. The plasma treatment chemically activates the surface of the carbon protective film 7 so that the topcoat layer 8 may be more firmly bonded thereto. The bond strength between the topcoat and the underlying protective film is then increased.

The plasma treatment may be carried out by a conventional well-known technique, for example, using a treating gas or gases such as argon, neon, helium, nitrogen and hydrogen and a power source in the frequency range between about 50 kHz and 2.45 GHz. Other parameters including current supply and treating time may be as usual.

The magnetic recording medium 1 of the present invention preferably has a nonmagnetic metal protective film 6 of Cr or similar metal interposed between the metal thin film magnetic layer 5 and the carbon protective film 7. The provision of the nonmagnetic metal protective film 6 significantly improves the durability and weatherability of the resulting magnetic recording medium. Most preferably, the nonmagnetic metal protective film 6 consist of Cr although a Cr content of at least 99% by weight is acceptable.

The nonmagnetic metal protective film 6 may be formed by any of known gas phase deposition processes, and usually it is preferable to form the protective film by sputtering.

The nonmagnetic metal protective film 6 generally has a thickness of about 30 to 300 Å, preferably about 50 to 200 Å.

On the substrate 2 optionally having the undercoat layer 3 is formed the metal thin film magnetic layer 5 comprising a major proportion of cobalt or cobalt and at least one of nickel, chromium, and phosphorus.

Illustrative examples of the composition of the metal thin film are Co-Ni, Co-Ni-Cr, Co-Cr, Co-Ni-P, Co-Zn-P, Co-Ni-Mn-Re-P, etc. Most preferred among them are Co-Ni, Co-Ni-Cr, Co-Cr, and Co-Ni-P. These alloys have the preferred compositions of Co-Ni having a proportion of Co:Ni between 1:1 and 9:1 in weight ratio; $(Co_xNi_y)_ACr_B$ wherein x:y=1:1 to 9:1 and A:B=99.9:0.1 to 75:25; Co-Cr having a proportion of Co:Cr=7:3 to 9:1; and $(Co_xNi_y)_AP_B$ wherein x:y=1:0 to 1:9 and A:B=99.9:0.1 to 85:15. Recording properties decline outside these ranges.

These metal thin film magnetic layer 5 may be formed by any desired gas and liquid phase plating techniques. Sputtering, one of gas phase plating as described above, is preferred because there are produced magnetic layers having favorable magnetic properties.

The material of the target used herein is an alloy or metal mixture corresponding to the composition of the desired metal thin film magnetic layer 5.

When the metal thin film magnetic layer 5 has a composition of CoP or CoNiP, liquid phase plating methods, inter alia, electroless plating may be employed. Magnetic layers obtained by liquid phase plating also exhibit as good magnetic properties as those obtained by sputtering.

The bath composition and operating parameters used in the electroless plating are known and any suitable combination thereof may be used herein, as disclosed in Japanese Patent Publication Nos. 54-9136 and 55-14865.

The metal thin film magnetic layer 5 generally has a thickness of 200 to 5,000 Å, and preferably 500 to 1,000 Å.

When the metal thin film magnetic layer 5 is formed by sputtering as described above, it is preferred to interpose a nonmagnetic metal intermediate layer 4 containing Cr between the undercoat layer 3 and the magnetic layer 5. The provision of the nonmagnetic metal intermediate layer 4 contributes to improvements in magnetic properties and reliability of recording properties of the medium. Most preferably the nonmagnetic metal intermediate layer 4 consists of Cr although a Cr content of at least 99% by weight is acceptable.

The intermediate layer 4 may be formed by any of various known gas phase film forming methods. Usually, it is preferred to form the intermediate layer by sputtering as in the metal thin film magnetic layer 5 described above. The thickness of the nonmagnetic metal intermediate layer 4 generally ranges from about 500 to about 4,000 Å although it depends on the type of the metal thin film magnetic layer 5.

The rigid substrate 2 used in the practice of the present invention may be made of such materials as metals, for example, aluminum and aluminum alloys, glass, ceramics, and engineering plastics. Aluminum and aluminum alloys are preferred among them because of their mechanical rigidity, workability, and bond to the undercoat layer.

The rigid substrate 2 generally has a thickness of about 1.2 to about 1.9 mm and a shape of disk or drum although no particular limit is imposed on the thickness and shape.

Particularly when the nonmagnetic rigid substrate 2 is a metal substrate, typically aluminum or aluminum alloy, it is preferred to form the undercoat layer 3 on the substrate. The undercoat layer 3 may have a composition of Ni-P, Ni-Cu-P, Ni-W-P, Ni-B or the like. It may be formed by liquid phase plating, particularly electroless plating. The electroless plating produces a very dense film having increased mechanical rigidity, hardness, and processability.

More specifically, the compositions of the undercoat layer may be represented by the formulae:

$(Ni_xCu_y)_AP_B$ and $(Ni_xW_y)_AP_B$, wherein x:y=100:0 to 10:90, and

A:B=97:3 to 85:15 in weight ratio. The Ni-B compositions are represented by the formula: $Ni_xB_y$ wherein x:y=97:3 to 90:10.

One exemplary process of the electroless plating involves alkaline degreasing, acidic degreasing, several cycles of zincate treatment, surface adjustment with sodium bicarbonate or similar agents, and subsequent plating in a nickel electroless plating bath at pH 4.0 to 6.0 at a temperature of about 80° to 95° C. for about ½ to about 3 hours. For further detail of the chemical plating, reference is made to Japanese Patent Publication Nos. 48-18842 and 50-1438.

The undercoat layer 3 has a thickness of about 3 to 50 μm, preferably about 5 to 20 μm.

In a further preferred embodiment, the undercoat layer 3 is provided with irregularities at the surface. To impart an irregular surface to the undercoat layer 3 on the disk-shaped substrate 2, abrasive is caused to act on the surface of the undercoat layer 3 while rotating the substrate, thereby forming irregular grooves on the undercoat surface in a concentric pattern. Alternatively, the irregularities may be randomly provided on the undercoat layer 3. The provision of irregularities results in improved properties of grip and durability.

When the undercoat layer 3 is absent, the substrate 2 may be directly provided with such irregularities on its surface.

Although the magnetic recording medium is described as a single-sided recording medium as shown in FIG. 1, it may be a double-side recording medium wherein a series of layers including a magnetic layer are formed on each surface of a substrate in a similar manner as in FIG. 1.

Due to the presence of a carbon protective film on a metal thin film magnetic layer and a topcoat layer of an organic fluorine compound on the protective film, the magnetic recording media of the present invention exhibit improved durability, abrasion resistance, weatherability, and corrosion resistance as well as minimized head grip, offerring high reliability in actual service.

EXAMPLES

In order that those skilled in the art will better understand the practice of the present invention, examples of the present invention will be described below.

EXAMPLE 1

On a disk-shaped aluminum substrate having a diameter of 13 cm and a thickness of 1.9 mm was formed an undercoat layer of NiP to a thickness of 20 μm by electroless plating. The electroless plating was carried out by succesively conducting the following steps under the described conditions.

NiP electroless plating

Steps & Their Conditions (1) Alkaline degreasing: Alprep 204 (Okuno Seiyaku K.K.) 250 ml/l, 65° C., 5 min.

(2) Acidic degreasing: Alprep 230 (Okuno Seiyaku K.K.) 150 ml/l, 65° C., 5 min.

(3) Zincate: Arp 302 (Okuno Seiyaku K.K.) 250 ml/l, 25° C., 30 sec.

(4) Zincate removal: 62 vol % conc. nitric acid 600 ml/l, 25° C., 30 sec.

(5) Zincate: Arp 302 (Okuno Seiyaku K.K.) 250 ml/l, 25° C., 20 sec.

(6) Surface adjustment: sodium bicarbonate 30 g/l, 20° C., 30 sec.

(7) Nickel plating: Niclad 719A (Okuno Seiyaku K.K.) 80 ml/l+ Niclad 719B (Okuno Seiyaku K.K.) 150 ml/l, pH 4.5, 90° C., 2 hours.

The thus deposited undercoat layer had a composition of Ni:P equal to 85:15 in weight ratio and a thickness of 20 μm.

In addition to the aluminum substrate having an undercoat of NiP carried thereon, substrates of various materials including aluminum, glass (available from Corning Glass), and plastics (polyetherimide resin) were also employed as reported in Table 1.

Then, the surface of various substrates (or the surface of the undercoat layer if the substrate has an undercoat on its surface) was abraded under the following conditions.

Surface Abrasion

The lapping machine used was Model 9B-5P manufactured by Speedfam K.K. While the substrate is being rotated, its surface was abraded using an abrasion liquid, Medipole No. 8 (50% diluted) manufactured by Fujimi Kenma K.K. under a load of 100 grams for 10 minutes.

The abraded substrate was cleaned in a disk cleaning apparatus available from Speedfam Clean System K.K. This cleaing includes the following steps. Cleaning
(1) Neutral detergent solution, dipping and ultrasonic cleaning,
(2) Superpure water, scrubbing,
(3) Superpure water, scrubbing,
(4) Superpure water, dipping and ultrasonic cleaning,
(5) Superpure water, dipping,
(6) Fron/ethanol mixture, dipping and ultrasonic cleaning,
(7) Fron/ethanol mixture, dipping,
(8) Fron/ethanol mixture, evaporation,
(9) Drying After the cleaning procedure, the surface of the substrate (or the surface of the undercoat layer if the substrate has an undercoat on its surface) was provided with irregularities by a texturizing procedure as described below. Using a tape polishing machine manufactured by Tomoe Techno K.K., irregular grooves were formed on the substrate surface in a concentric pattern while the substrate is being rotated. The polishing parameters are: polishing tape #4000, contact pressure 1.2 kg/cm$^2$, oscillation 50 cycles/min., and 150 work revolutions per minute.

After the substrate was cleaned again by substantially the same procedures as described above, the substrate was subjected to an etching treatment under an argon gas pressure of 0.2 Pa and an RF power of 400 W, and chromium was sputtered to form a nonmagnetic metal intermediate layer on the substrate to a thickness of 2,000 Å. The sputtering parameters are: argon pressure 2.0 Pa and DC 8 kilowatts.

Thereafter, one of the following variety of metal thin film magnetic layers was formed contiguous to the intermediate layer. It should be noted that in case the magnetic layer be formed by electroless plating, the etching treatment mentioned above and the nonmagnetic metal intermediate layer of Cr were omitted.

Preparation of metal thin film magnetic layer

Magnetic layer No. 1 (ML1)

A CoNi magnetic layer was formed by sputtering under an argon pressure of 2.0 Pa and DC 8 kilowatts. The CoNi composition was Co/Ni=80/20 in weight ratio. The film thickness was 600 Å.

Magnetic layer No. 2 (ML2)

A CoNiCr magnetic layer was formed by sputtering under an argon pressure of 2.0 Pa and DC 8 kilowatts. The CoNiCr composition was Co/Ni/Cr=62.5/30/7.5 in weight ratio. The film thickness was 600 Å.

Magnetic layer No. 3 (ML3)

A CoCr magnetic layer was formed by sputtering under an argon pressure of 2.0 Pa and DC 8 kilowatts. The CoCr composition was Co/Cr=87/13 in weight ratio. The film thickness was 1000 Å.

Magnetic layer No. 4 (ML4)

A CoNiP magnetic layer was formed by electroless plating under conditions described below. The CoNiP composition was Co/Ni/P=6/4/1 in weight ratio. The film thickness was 1000 Å.

The steps and conditions of the electroless plating process are given below.
(1) Alkaline degreasing: Alprep 204 (Okuno Seiyaku K.K.) 250 ml/l, 65° C., 5 min.
(2) Acidic degreasing: Alprep 230 (Okuno Seiyaku K.K.) 150 ml/l, 65° C., 5 min.
(3) Hydrochloric acid degreasing: 5 vol % HCl, 25° C., 1 min.
(4) Sulfuric acid degreasing: 5 vol % H$_2$SO$_4$, 25° C., 1 min.
(5) Nickel plating: Niclad 719A (Okuno Seiyaku K.K.) 80 ml/l+Niclad 719B (Okuno Seiyaku K.K.) 150 ml/l, pH 4.5, 90° C., 30 sec.

| (6) Cobalt plating: plating bath | mol/liter |
|---|---|
| Cobalt sulfate | 0.06 |
| Nickel sulfate | 0.04 |
| Sodium hypophosphite | 0.25 |
| Rochelle salt | 1.00 |
| Ammonium sulfate | 0.40 |
| Boric acid | 0.10 | plus NaOH, pH 9.5, 70° C., 3 min.

On each of the various metal thin film magnetic layers thus deposited was formed a nonmagnetic metal protective film of Cr. Film deposition was by sputtering chromium under an argon gas pressure of 2.0 Pa and DC 8 kilowatts. The film was 200 Å thick.

On the protective film was formed a carbon protective film as reported in Table 1 by sputtering carbon under an argon gas pressure of 0.2 Pa and DC 8 kilowatts. The protective film was 400 Å thick.

It is to be noted that only when the metal thin film magnetic layer is of magnetic layer No. 4 as identified above, the surface of the metal thin film magnetic layer was etched under an argon gas pressure of 0.2 Pa and an RF power of 400 watts immediately before the nonmagnetic metal protective film was deposited.

The surface of the carbon protective film was plasma treated if desired as reported in Table 1 by "Yes" or "No". The plasma treatment used the treating gas of N$_2$ at a pressure of 5 Pa, using a high frequency power source of 13.56 MHz with a supply power of 3 kW.

On top of the carbon protective film was formed a topcoat layer by depositing a topcoat composition containing selected one of various organic fluorine compounds as mentioned below using a selected process. The topcoat layers were formed to varying thicknesses as reported in Table 1.

Topcoat layer composition

Topcoat Composition 1 (TC1)

The topcoat layer was deposited by evaporation. The evaporation source used was the solids of KRYTOX 157FS commercially available from E. I. DuPont and having the structural formula:

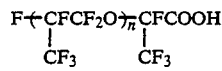

wherein n is 11 to 49. The evaporation conditions included an argon atmosphere at a pressure of $1 \times 10^{-2}$ Pa and a sample-to-source distance of 5 cm.

Topcoat Composition 2 (TC2)

The topcoat layer was deposited by evaporation. The evaporation source used was the solids of FOMBLIN Y 25 having a molecular weight of 3,000 and commercially available from Montefluos Company. The evaporation conditions were the same as those of TC 1.

Topcoat composition 3 (TC3)

The topcoat layer was deposited by evaporation. The evaporation source used was the solids of KRYTOX 143AZ commercially available from E. I. DuPont and having a molecular weight of 2,000 and the structural formula:

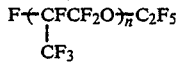

The evaporation conditions were the same as those of TC 1.

Topcoat composition 4 (TC4)

The topcoat layer was deposited by evaporation. The evaporation source used was the solids of Vydax 525 which is a tetrafluoroethylene polymer available from E. I. DuPont and having a molecular weight of 3,700, a solid content of 2.5% by weight, and a viscosity of 6 centipoises at 25° C. The evaporation conditions used were the same as those of TC 1.

Topcoat composition 5 (TC5)

The topcoat layer was deposited by sputteing. The source material used as the target in sputtering was KRYTOX 157FS. The resin composition was applied onto a plate followed by evaporation of the solvent therefrom obtaining a plate-like target of the solid resin.

The sputteing conditions included a sputtering power of 3 kW, an operating pressure of 1 Pa and a sample-to-target distance of 10 cm. The resin target had dimensions of about 15 cm by 30 cm. The inert gas used in the sputtering was argon.

Topcoat compositions 1 through 5 are within the scope of the present invention.

Topcoat composition F-Oil

The lubricant used was a fluoride oil (Daifloyl #50, manufactured by Daikin Kogyo K.K.) having the structural unit:

a molecular weight of 700. The lubricant was mixed with a Fron 113 solvent commercially available as Daifron S-3 from Daikin Kogyo K.K., Japan to form a coating solution containing 0.05% by weight of the lublicant. The solution was coated to form a topcoat.

Topcoat composition Si-Oil

It was the same as above except that the lubricant used was a silicone oil (Toshiba Silicone TSF451) having a viscosity of 1,000 centipoise.

Coating compositions F-Oil and Si-Oil, which are outside the scope of the present invention, were employed for comparative purposes.

In this way, a number of magnetic disk samples were fabricated as reported in Table 1 and measured for various properties.

Sample Nos. 23 through 25 had no carbon protective layer as shown in Table 1.

Sample Nos. 21 and 22 omitted the texturing treatment of their underlying layer as shown in Table 1.

(1) CSS

A contact-start-and-stop (CSS) test was carried out. The number of errors per disk recording side of a magnetic disk sample was counted both immediately after fabrication and after 30,000 contact-start-and-stop cycles. An increase of the number of errors or missing pulses before and after the CSS test was reported in bits per side.

The number of errors per disk recording side was counted using a disk certifier manufactured by Hitachi Electronic Engineering K.K. with the slicing level of missing pulses set at 65%.

(2) Frictional durability

A magnetic disk sample, after 30,000 contact-start-and-stop cycles, was measured for coefficient of friction $\mu$ on the surface adjacent its magnetic layer. A friction meter manufactured by Patic K.K. was used.

(3) Grip

A Mn-Zn ferrite head was stationarily placed on the surface of a magnetic disk sample at 20° C. and 60% RH for 72 hours. The disk sample was suddenly started rotating to measure an initial coefficient of friction.

The results are shown in Table 1.

TABLE 1

| Sample No. | Substrate | Under-coat | Texturing | Magnetic layer | C protective film | Plasma treatment | Topcoat Composition | Thickness (Å) | CSS, error (bit/side) | Frictional durability | Grip |
|---|---|---|---|---|---|---|---|---|---|---|---|
| 1 | Al | NiP | Yes | ML1 | Yes | Yes | TC1 | 50 | 0 | 0.25 | 0.12 |
| 2 | Al | NiP | Yes | ML1 | Yes | Yes | TC2 | 50 | 0 | 0.22 | 0.10 |
| 3 | Al | NiP | Yes | ML1 | Yes | Yes | TC3 | 50 | 0 | 0.22 | 0.11 |
| 4 | Al | NiP | Yes | ML1 | Yes | Yes | TC4 | 50 | 0 | 0.20 | 0.09 |
| 5 | Al | NiP | Yes | ML1 | Yes | Yes | TC5 | 50 | 0 | 0.23 | 0.11 |
| 6 | Al | NiP | Yes | ML2 | Yes | Yes | TC1 | 50 | 0 | 0.25 | 0.10 |

TABLE 1-continued

| Sample No. | Substrate | Under-coat | Texturing | Magnetic layer | C protective film | Plasma treatment | Topcoat Composition | Topcoat Thickness (Å) | CSS, error (bit/side) | Frictional durability | Grip |
|---|---|---|---|---|---|---|---|---|---|---|---|
| 7 | Al | NiP | Yes | ML3 | Yes | Yes | TC1 | 50 | 0 | 0.24 | 0.11 |
| 8 | Al | NiP | Yes | ML4 | Yes | Yes | TC1 | 50 | 0 | 0.29 | 0.13 |
| 9 | Al | No | Yes | ML1 | Yes | Yes | TC1 | 50 | 5 | 0.55 | 0.25 |
| 10* | Al | No | Yes | ML1 | Yes | No | No | — | 400 | >1.0 | 0.95 |
| 11 | glass | NiP | Yes | ML1 | Yes | Yes | TC1 | 50 | 0 | 0.27 | 0.19 |
| 12* | glass | NiP | Yes | ML1 | Yes | No | No | — | 220 | >1.0 | 0.90 |
| 13 | plastics | NiP | Yes | ML1 | Yes | Yes | TC1 | 50 | 25 | 0.35 | 0.20 |
| 14* | plastics | NiP | Yes | ML1 | Yes | No | No | — | 600 | >1.0 | 0.92 |
| 15 | Al | NiP | Yes | ML1 | Yes | Yes | TC1 | 500 | 0 | 0.28 | 0.37 |
| 16 | Al | NiP | Yes | ML1 | Yes | Yes | TC1 | 2 | 5 | 0.80 | 0.24 |
| 17* | Al | NiP | Yes | ML1 | Yes | No | No | — | 250 | >1.0 | 0.93 |
| 18 | Al | NiP | Yes | ML1 | Yes | No | TC1 | 50 | 0 | 0.35 | 0.18 |
| 19* | Al | NiP | Yes | ML1 | Yes | Yes | F-Oil | 50 | 8 | 0.95 | 0.32 |
| 20* | Al | NiP | Yes | ML1 | Yes | Yes | Si-Oil | 50 | 11 | 0.97 | 0.38 |
| 21 | Al | NiP | No | ML1 | Yes | Yes | TC1 | 50 | 0 | 0.30 | 0.19 |
| 22* | Al | NiP | No | ML1 | Yes | No | No | — | 240 | >1.0 | >1.0 |
| 23 | Al | NiP | Yes | ML1 | No | Yes | TC1 | 50 | 25 | 0.30 | 0.12 |
| 24* | Al | NiP | Yes | ML1 | No | Yes | Si-Oil | 50 | 400 | >1.0 | 0.40 |
| 25* | Al | NiP | Yes | ML1 | No | No | No | — | 2000 | >1.0 | >1.0 |

*comparison

I claim:

1. A magnetic recording medium comprising:
a rigid substrate,
a metal thin film magnetic layer on the substrate,
a protective film of carbon on the magnetic layer wherein the film at its surface is plasma treated, and
a topcoat layer of 3 to 300 Å of an organic fluorine compound formed on the protective film by gas phase deposition, wherein the organic fluorine compound is at least one member selected from the group consisting of (1) perfluoropolyethers; (2) carboxy perfluoropolyethers and salts and esters thereof; and (3) fluorocarbon resins selected from polytetrafluoroethylene of molecular weight of 1,000 to 10,000, polyvinylidene fluoride, polyvinyl fluoride, tetrafluoroethylene-hexafluoropropylene copolymers, tetrafluoroethylene-ethylene copolymers, tetrafluoroethylene-perfluoro-alkylvinyl ether copolymers and chlorotrifluoroethylene-ethylene copolymers.

2. The magnetic recording medium of claim 1 which further comprises a nonmagnetic metal protective layer between the metal thin film magnetic layer and the carbon protective film.

* * * * *